(12) United States Patent
Trabona

(10) Patent No.: US 8,812,273 B2
(45) Date of Patent: *Aug. 19, 2014

(54) METHODS FOR GENERATING DESIGN PLANS FOR PHYSICAL SPACES

(71) Applicant: Kenneth L. Trabona, Little Falls, NJ (US)

(72) Inventor: Kenneth L. Trabona, Little Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,779

(22) Filed: Aug. 13, 2013

(65) Prior Publication Data

US 2013/0346032 A1     Dec. 26, 2013

Related U.S. Application Data

(63) Continuation of application No. 10/991,572, filed on Nov. 18, 2004, now Pat. No. 8,543,358.

(60) Provisional application No. 60/524,207, filed on Nov. 21, 2003.

(51) Int. Cl.
  *G06F 17/50* (2006.01)
  *G06Q 30/06* (2012.01)

(52) U.S. Cl.
  CPC ............ *G06F 17/5004* (2013.01); *G06Q 30/06* (2013.01); *G06F 2217/04* (2013.01)
  USPC .......................................................... 703/1

(58) Field of Classification Search
  CPC ................ G06F 17/5004; G05B 2219/37115; G06Q 30/0601
  USPC ............................................................ 703/1
  See application file for complete search history.

(56) References Cited

U.S. PATENT DOCUMENTS

| 5,742,264 | A | 4/1998 | Inagaki et al. |
| 6,032,130 | A * | 2/2000 | Alloul et al. ............... 705/14.34 |
| 6,912,293 | B1 | 6/2005 | Korobkin |
| 7,383,190 | B1 | 6/2008 | Petruccelli et al. |
| 8,543,358 | B2 * | 9/2013 | Trabona .......................... 703/1 |
| 2002/0006602 | A1 | 1/2002 | Masters |
| 2002/0032546 | A1 | 3/2002 | Imamura et al. |
| 2005/0283345 | A1 | 12/2005 | Trabona |

* cited by examiner

Primary Examiner — Dwin M Craig
(74) Attorney, Agent, or Firm — Doherty IP Law Group LLC

(57) ABSTRACT

A method for generating a design plan for a physical space includes providing a main computer having a database of design products and a remote computer in communication with the main computer, placing an object within a physical space, directing a camera toward the physical space, using the camera to capture a first digital image of the physical space at a first angle and a second digital image of the physical space at a second angle, with the object visible in both digital images. The captured digital images are transmitted to the main computer, photogrammetrically assimilated to produce a three-dimensional data set rendering of the physical space. The method includes using the three-dimensional data set rendering to create a design plan for the physical space, storing the design plan on the main computer, and using the remote computer for accessing the design plan from the main computer.

21 Claims, 12 Drawing Sheets

1

METHODS FOR GENERATING DESIGN PLANS FOR PHYSICAL SPACES

CROSS REFERENCE TO RELATED APPLICATIONS

The present application is a continuation of U.S. patent application Ser. No. 10/991,572, filed on Nov. 18, 2004, which published as U.S. Patent Application Publication No. 2005/0283345, now U.S. Pat. No. 8,543,358, which claims benefit of U.S. Provisional Application No. 60/524,207, filed on Nov. 21, 2003, the disclosures of which are hereby incorporated by reference herein.

FIELD OF THE INVENTION

The present invention involves the field of computer-assisted design in general and specifically relates to a method and system for generating a directed design and order placement of materials therefore.

BACKGROUND OF THE INVENTION

Designers, architects and planners are often used by clients to help create a design and plan specific for a particular application. In particular, a homeowner, customer or builder may use a designer to create a kitchen layout setting forth a plan for location and placement of kitchen cabinets and appliances. The client may then select from available cabinet, counter and appliance types, which are then ordered from a vendor for placement. The overall design plan and selection are determined using aesthetic, functional and budgetary constraints.

The designer must be able to visualize the space requiring design, using blueprints, photographic images or a site visit. The client must be able to view samples of cabinets, appliances and countertops, either using photographs, or by in person viewing of a vendor's products.

Interaction between the designer and the client yields a design plan meeting the client's requirements.

It is well recognized that computer assistance improves the efficiency of the overall design program, reduces inefficiency particularly in measuring and product selection, and improves client access to broad selections of materials information.

Graphical computer systems for generating design plans have been described in the art. (See U.S. Pat. Nos. 5,966,454; 6,005,969 and 6,459,435). In specific applications, methods for computer-based kitchen design are known in the art. (See U.S. Pat. Nos. 5,255,207; and 5,975,908). Kiosk computer terminals, which are generally self-contained, enclosed units having computer, video, and audio capabilities, often with a touch-screen are known in the art. (See U.S. Pat. Nos. 6,437,809; 6,415,291; 5,552,994; 5,949,411; 6,029,142; 6,536,663; 6,381,583; and 5,615,123. A kiosk terminal is often connected to a host computer system. (See U.S. Pat. No. 4,674,041). Thus, kiosks are often internet-mediated and network-mediated to effect electronic transactions using user-provided specifications.

Numerous websites on the Internet purporting to provide computer-based kitchen design, both relying on computer software alone and computer-assisted, but mediated by human designers. Another example is the website for Home Portfolio, Inc., which presents a selection of design products and directs the user to their nearest retailer.

The above advances in the field notwithstanding, the design process remains cumbersome, inefficient and difficult for many clients who are unable to achieve a directed design specific to their site and to obtain and order a wide selection of site specific materials meeting their design criteria.

The present invention solves these long-standing problems by coordinating a method for the directed design process, the designer, product selection and ordering with site-specific detail, images and measurements.

SUMMARY OF THE INVENTION

Therefore it is an object of the present invention to provide a method for generating a directed design for a physical space requiring design comprising the steps of (a) maintaining a main computer, wherein the main computer is capable of exchanging data with a remote computer; (b) providing a means for acquiring digitally encoded signals representing an image of the physical space; (c) storing the digitally encoded signals in a imaging computer storage medium; (d) transmitting the stored digitally encoded signals to a design center; (e) designing an interior design plan using the transmitted digitally encoded signals; (f) storing the design plan in a design computer storage medium; (g) transmitting the stored design plan to the main computer; and (h) providing for remote computer communication link access to the stored design plan.

It is a further object of the present invention to provide a system for generating a directed design, the system comprising (a) a main computer, wherein the main computer is capable of exchanging data with a remote computer; (b) a means for accepting digitally encoded signals representing an image of a physical space requiring design; (c) a means for storing the digitally encoded signals in a imaging computer storage medium; (d) a means for transmitting the stored digitally encoded signals to a design center; (e) a designer for designing an interior design plan using the transmitted digitally encoded signals; (f) a means for storing the design plan in a design computer storage medium; (g) a means for transmitting the stored design plan to the main computer; and (h) a means for providing for remote computer communication link access to the stored design plan.

These and other preferred embodiments of the present invention will be described in more detail below.

DETAILED DESCRIPTION

Figure 1:
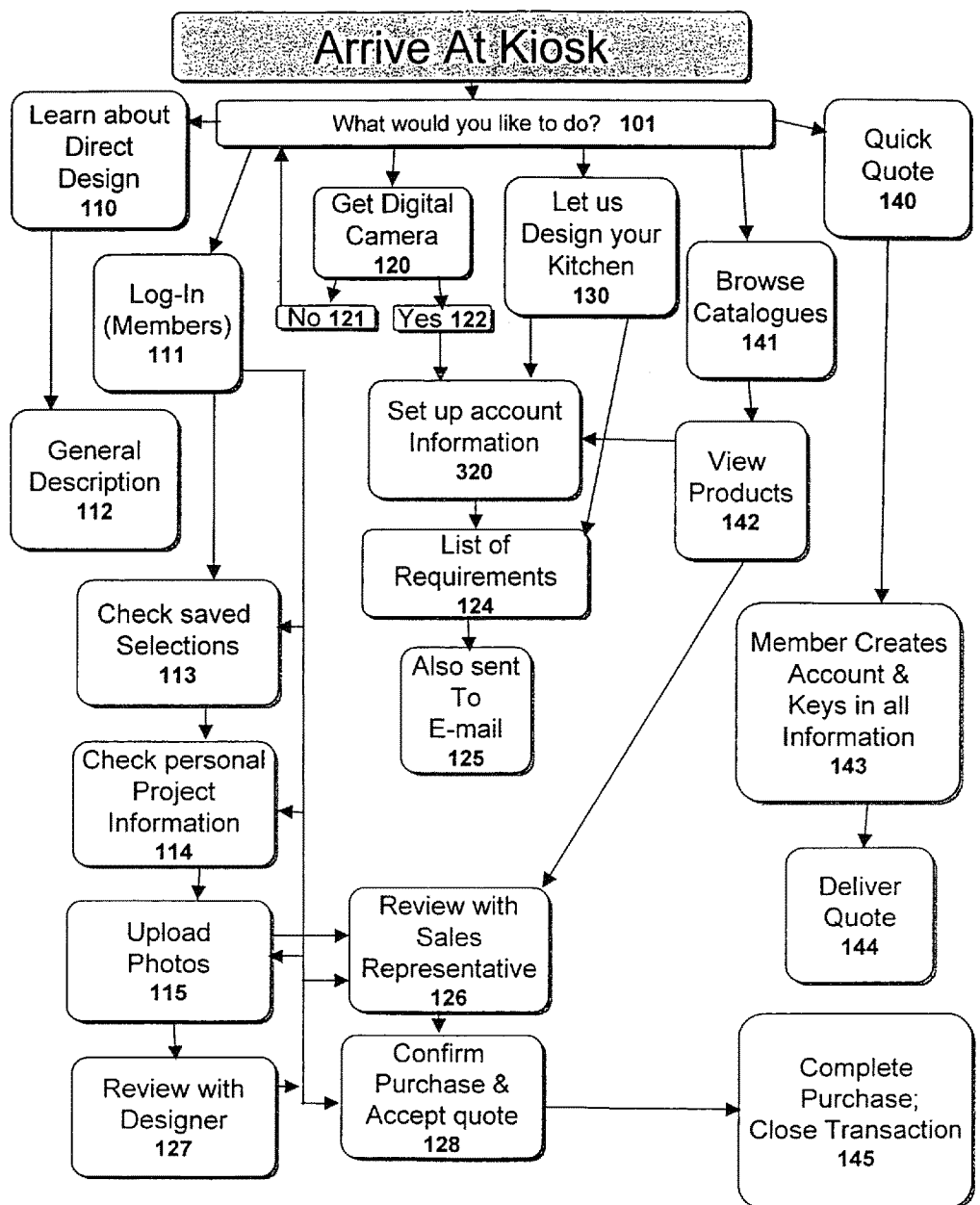
FIG. 1: Flow chart describing an exemplary interaction of a client at a kiosk for kitchen design located at a physical vendor location.

The present invention provides a method for generating a directed design for a physical space requiring design comprising the steps of (a) maintaining a main computer, wherein the main computer is capable of exchanging data with a remote computer; (b) providing a means for acquiring digitally encoded signals representing an image of the physical space; (c) storing the digitally encoded signals in a imaging computer storage medium; (d) transmitting the stored digitally encoded signals to a design center; (e) designing an interior design plan using the transmitted digitally encoded signals; (f) storing the design plan in a design computer storage medium; (g) transmitting the stored design plan to the main computer; and (h) providing for remote computer communication link access to the stored design plan. It is contemplated that stored images may accurately represent true image measurements and dimensions. It is further contemplated that design plan may represent actual measurements and images.

According to still anther embodiment of the invention, wherein the remote computer is capable of transmitting a data request to the main computer. According to still yet another embodiment of the present invention, the method further comprises the step of transmitting an order request for the design product from the remote computer to the main computer. According to a further embodiment of the invention, a plurality of vendor computers exchange product data information with the main computer. Still according to another embodiment of the invention, the method is further comprising the step of displaying the design plan on the remote computer. According to another embodiment of the invention, the method is further comprising the step of displaying a plurality of design products on the kiosk, corresponding to user search criteria. It is specifically contemplated that design products may be stored in a plurality of databases, which may be independently maintained by a plurality of vendors. According to this embodiment, a user may select from a variety of displayed vendor products and styles such as in the case of kitchen design: cabinetry, countertops, fixtures, appliances and hardware. According to this embodiment, the user selection may be effected through the use of a touch screen type kiosk. According to a variant embodiment, the user selection may be effected via a keyboard, keypad or pointing device. According to another variant embodiment, the selection may be effected at the user's personal home computer via an online communications link such as the Internet. According to another embodiment of the invention, the remote computer is an electronic computer kiosk, wherein the kiosk is electronically linked to a main computer. According to yet another embodiment of the invention, the method is further comprising the step of transmitting the stored digitally encoded signals to the main computer. According to still another embodiment, the design center comprises a human designer. According to yet still another embodiment of the invention, the design center comprises a design computer. It is specifically contemplated that the design computer may be a computing device dedicated specifically to design function and directed design plan generation. According to an alternative embodiment of this invention, the design computer is the main computer. The design computer is capable of executing software programs facilitating generation of the design plan. According to a further embodiment of the invention, the electronic computer kiosk is located at a physical location, the location being a vendor of design products. According to a particular embodiment of the invention, the directed design is a kitchen design plan. It is specifically contemplated that this invention may be embodied in generating a design for a variety of plans including but not limited to any field requiring design such as landscaping, building, interiors, exteriors, clothing and product placement. According to a preferred embodiment of the invention, the design product is a kitchen design product. According to yet a further embodiment of the invention, the main computer stores data related to a plurality of design products. According to a preferred embodiment of this invention, the method further comprises the step of displaying data related to the design product on the remote computer. According to still yet another embodiment of this invention, the means for accepting digitally encoded signals is a digital camera. Alternative imaging devices such as digitizers and scanner are specifically contemplated by the invention. According to one embodiment of this invention, conventional photographs taken of the space requiring design are scanned into digital format for transmission to the design center. According to another embodiment, a user captures images using a portable cell phone based imaging device. According to still another embodiment of this invention, the digitally encoded signals encode a two-dimensional image of the space requiring design, reflected as the site-plan dimensions. According to one embodiment of this invention, the actual dimensions of the image represented by the digitally encoded signals are calculated as a scale factor, wherein the scale factor has units of length per pixel and is obtained by (a) establishing a known distance in the image, the known distance having a first point and an end point, and dividing the known distance by the number of pixels represented on the straight line between the first point and the end point of the known distance; (b) measuring a pixel distance on the image, the pixel distance having a first pixel and a last pixel, wherein the pixel distance is the number of pixels represented on the straight line between the first pixel and the last pixel; and (c) multiplying the pixel distance by the scale factor. The present invention specifically contemplates alternative methods of photogrammetry and pixel analysis in order to transform various two-dimensional images of the space into specific dimensions. The present invention contemplates that displays may include videographic audio representations in a real-time fashion, including streaming video and audio. The present invention further provides the method further comprising the step of displaying the design plan on a virtual reality device. In a particular embodiment, the virtual reality device is a device worn by a user. In a most preferred embodiment of this invention, the virtual reality device is a headset. It is also specifically contemplated that smells may be introduced into the virtual reality device, thus providing a user with a more complete sense of environment. According to one such embodiment, a user wearing a virtual reality headset can experience a virtual kitchen complete with the aromas of cooked food.

The present invention also provides system for generating a directed design, the system comprising (a) a main computer, wherein the main computer is capable of exchanging data with a remote computer; (b) a means for accepting digitally encoded signals representing an image of a physical space requiring design; (c) a means for storing the digitally encoded signals in a imaging computer storage medium; (d) a means for transmitting the stored digitally encoded signals to a design center; (e) a designer for designing an interior design plan using the transmitted digitally encoded signals; (f) a means for storing the design plan in a design computer storage medium; (g) a means for transmitting the stored design plan to the main computer; and (h) a means for providing for remote computer communication link access to the stored design plan. The present invention also provides a computer program product to effectuate the provided method.

The present invention may be practiced on a single computer, preferably using a client-server architecture. However, because the present invention preferably involves storage and/or searching of large numbers of graphical images of design products, the present invention preferably is implemented on a client-server system, wherein at least one client computer and at least one server computer is connected over a network, such as the Internet.

The Internet is a worldwide-decentralized network of computers having the ability to communicate with each other. The Internet has gained broad recognition as a viable medium for communicating and for conducting business. The World-Wide Web (Web) is comprised of server-hosting computers (Web servers) connected to the Internet that have hypertext documents (referred to as Web pages) stored there within. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Website is conventionally a related collection of Web files that includes a beginning file called a "home" page. From the home page, a visitor can access other files and applications at a Web site. A large Web site may utilize a number of servers, which may or may not be different and which may or may not be geographically dispersed. For example, the Web site of the International Business Machines Corporation (www.ibm.com) includes thousands of Web pages and files spread out over multiple Web servers in locations worldwide.

A Web server (also referred to as an HTTP server) is a computer program that generally utilizes HTTP to serve files that form Web pages to requesting Web clients. Exemplary Web servers include International Business Machines Corporation's family of Lotus Domino® servers, the Apache server (available from www.apache.org), and Microsoft's Internet Information Server (IIS), available from Microsoft Corporation, Redmond, Wash. A Web client is a requesting program that also generally utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized with the present invention include, but are not limited to, Netscape Navigator® (America Online, Inc., Dulles, Va.) and Internet Explorer® (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects a particular hypertext link, a browser running on the user's client device reads and interprets an address, called a Uniform Resource Locator (URL) associated with the link, connects the browser with a Web server at that address, and makes a request (e.g., an HTTP request) for the file identified in the link. The Web server then sends the requested file to the client device, which the browser interprets and renders within a display screen.

One of skill in the art will appreciate that the present invention may be embodied as methods, data processing systems, and/or computer program products. Accordingly, the present invention may predominantly take the form of a hardware embodiment, a predominantly software embodiment running on general-purpose hardware or an embodiment predominantly combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", JavaScript, Visual Basic, TSQL, Pen, or in a functional (or fourth generation) programming language such as Lisp, SML, or Forth. In addition, Microsoft Active Server Pages (ASP) technology and Java Server Pages (JSP) technology may be utilized. PHP is a widely used general-purpose scripting language that is especially suited for Web development and can be embedded into HTML. The program code may execute entirely on one or more Web servers and/or application servers, or it may execute partly on one or more Web servers and/or application servers and partly on a remote computer (i.e., a user's Web client), or as a proxy server at an intermediate point in the network. In the latter scenario, the remote computer may be connected to the Web server through a LAN or a WAN (e.g., an intranet), or the connection may be made through the Internet (e.g., via an Internet Service Provider).

The present invention is described below with reference to block diagram and flowchart illustrations of methods, apparatus (systems) and computer program products according to an embodiment of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

One of skill in the art will appreciate that a database is a collection of data that is organized in tables or other conventional forms of organization. A database typically includes a database manager and/or database server that facilitates accessing, managing, and updating data within the various tables of a database. Exemplary types of databases that can be used to implement the product database of the present invention include relational databases, distributed databases (databases that are dispersed or replicated among different points in a network), and object-oriented databases. Relational, distributed, and object-oriented databases are well understood by those of skill in the art and need not be discussed further herein. Since the present invention preferably includes large quantities of design products such as kitchen design products in the preferred embodiment of the present invention, a database system that is particularly adapted for storing and searching large numbers of products, such as Oracle 8i Visual Image Retrieval (VIR) available from Oracle Corp., Redwood Shores, Calif. may be used. See the Oracle 8i Visual Information Retrieval Data Sheet, March 1999. However, other databases may be used, including IBM's DB2® database, Microsoft's SQL server database, and database products from Sybase and Computer Associates.

The database server is an application server that operates as a "middleman" server between the Web server and the plurality of databases. The database server generally includes program code and logic for retrieving data from the databases (and from sources external to the Web site) in response to requests from the Web server. The database server preferably is adapted for searching and storing of large numbers of kitchen design products, such as Oracle VIR. Other commercial database servers that may be utilized as a database server in the illustrated system include Microsoft's SQL server, IBM DB2® Universal Database server, and the WebSphere® Net.Commerce server, the latter two being available from International Business Machines Corporation, Armonk, N.Y.

Virtual reality is the simulation of an environment that can be represented in a three-dimensional display representing width, height, and depth. A virtual reality device can provide a user a user with the ability to interact with the virtual simulated environment. Such interaction may include full real-time motion with sound and possibly with tactile and other forms of feedback. The simplest form of virtual reality is a three dimensional image that can be explored interactively at a personal computer, usually by manipulating keys or the mouse so that the content of the image moves in some direction or zooms in or out. More sophisticated efforts involve such approaches as wrap-around display screens, actual rooms augmented with wearable computers, and joystick devices that provide a user with the "feel" of display images. A virtual reality device can simulate a real environment such as the interior of a building or a design space, such as a kitchen. Moreover, the device can display the environment in a variety of formats and from a variety of angles. Changing certain parameter such as the cabinet style in a kitchen will result in the changed display, giving the user the ability to "virtually" preview and tryout various combinations or environmental changes before actually performing physical changes in a real space. Virtual reality devices have been widely described including in U.S. Pat. No. 5,991,085 and references therein.

One of skill in this art will appreciate that a kiosk is generally a terminal for performing tasks, which may be computerized, and which exists in a specific physical space. In the present invention, a kiosk is defined as a device capable of digitally transmitting digitally encoded signals to a main computer.

Digitally transmitting is the act of sending images, information, or other materials electronically from a device capable of sending digitally encoded signals to a device capable of receiving the signals, in a digital format. Digital formats are known to those skilled in the art and will not be further discussed. Similarly, a digitally encoded signal is an electronic signal in digital format.

A main computer is a device capable of sending and receiving digitally encoded signals from kiosks. A main computer for purposes of the present invention has other capabilities, which may include accessing a database of kitchen design products, routing digitally-encoded signals to other devices, or serving as general electronic storage media. General electronic storage media is well known to those skilled in this art.

Again, the present invention may be practiced using a single main computer, or using a series of electronically linked computers, each having separate and distinct information.

Directed design is the practice and field of arranging and positioning fixtures in an efficient and aesthetically pleasing orientation. Kitchen design is the practice and field of arranging kitchen areas in an efficient and aesthetically pleasing manner.

Design products are the elements and fixtures particular to a particular design application. For example, in the preferred embodiment, kitchen design products are known to those skilled in the art and are all those elements which found in a kitchen area, including but not limited to refrigerators, stoves, sinks, automatic dishwashers and other functional appliances; cabinets, counter-tops, cabinet doors, and other structural elements; tables, chairs, lighting fixtures, flooring material, and other decorative elements and furnishings.

One of skill in the art will appreciate that photogrammetry generally refers to relativity of dimensions and measurements. In the present invention, photogrammetry is the practice of determining the physical dimensions of objects that appear in a digital image.

In order to use photographs in a computer environment, they must be converted into digital format. There are several ways to convert photographs into digital format; they can be obtained directly from a digital camera or scanned into the computer using a scanning device. Once in digital format, photos can be enhanced for printing, or imported into specific software for dimension extraction (Photogrammetry). Specific areas in the photo can then be highlighted. Thus, photogrammetry for purposes of this invention is the process of extracting dimensions from two-dimensional photographs.

The object(s) from which dimensions need to be extracted must appear in more than one photograph and viewed from different angles, most preferably from ninety-degree intervals. Also known as photogrammetry in the art, photogrammetry techniques thus allow conversion of images of an object into a 3D model. Using a digital camera with known characteristic (lens focal length, imager size and number of pixels).

A digital image is an image in digital format, defined by a rectangular matrix of pixels. A pixel is a single point on imaging media, which may include computer monitors, television screens, or other devices capable of displaying an image in digital format.

Conventionally, in photogrammetry, images of an existing structure or location are captured; the images are then scanned into a computer. From the scanned images the computer can dimension the building to within an accuracy of a few millimeters.

Figure 2:
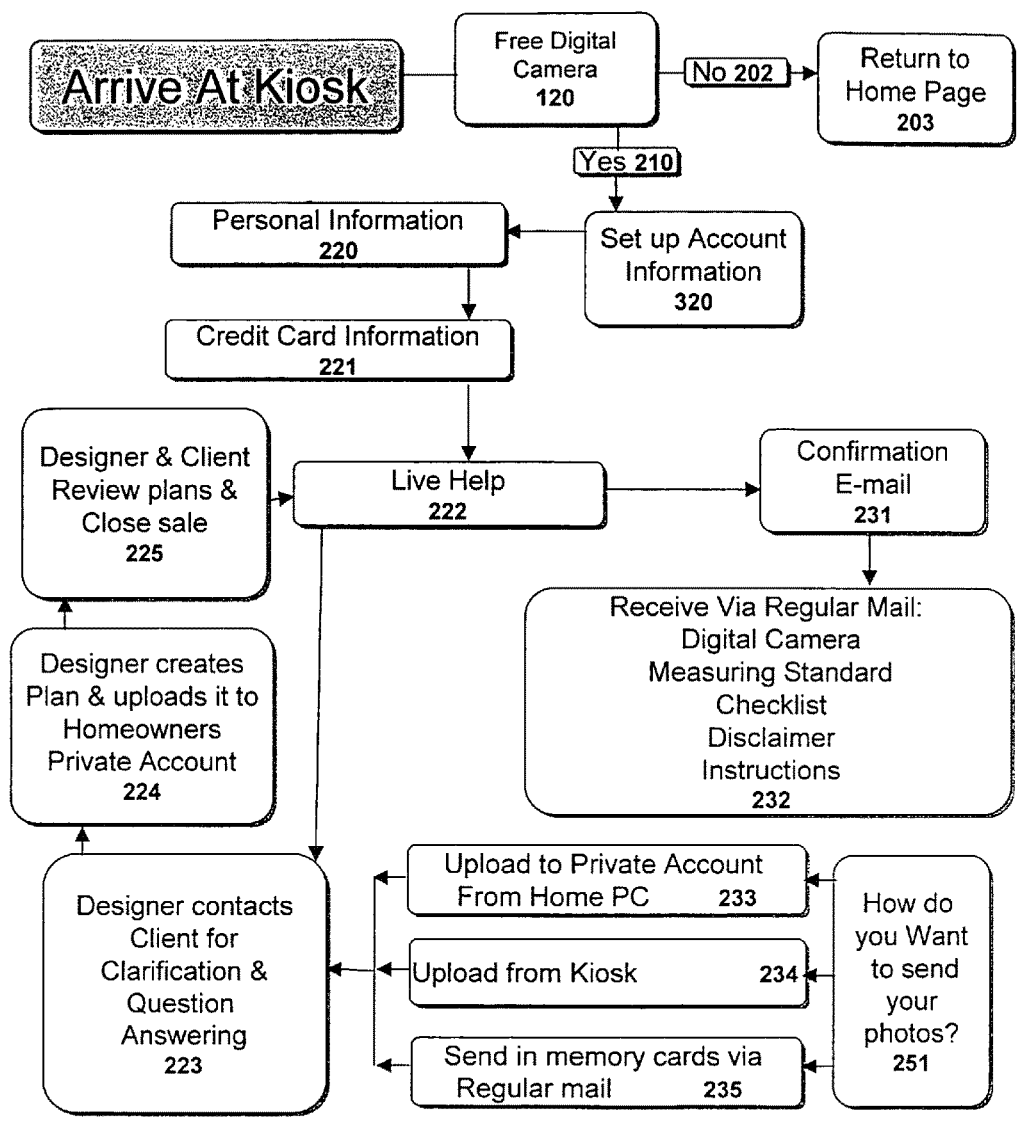
FIG. 2: Flow chart describing an exemplary interaction of a client at a kiosk for kitchen design located at a physical vendor location.
Figure 3:
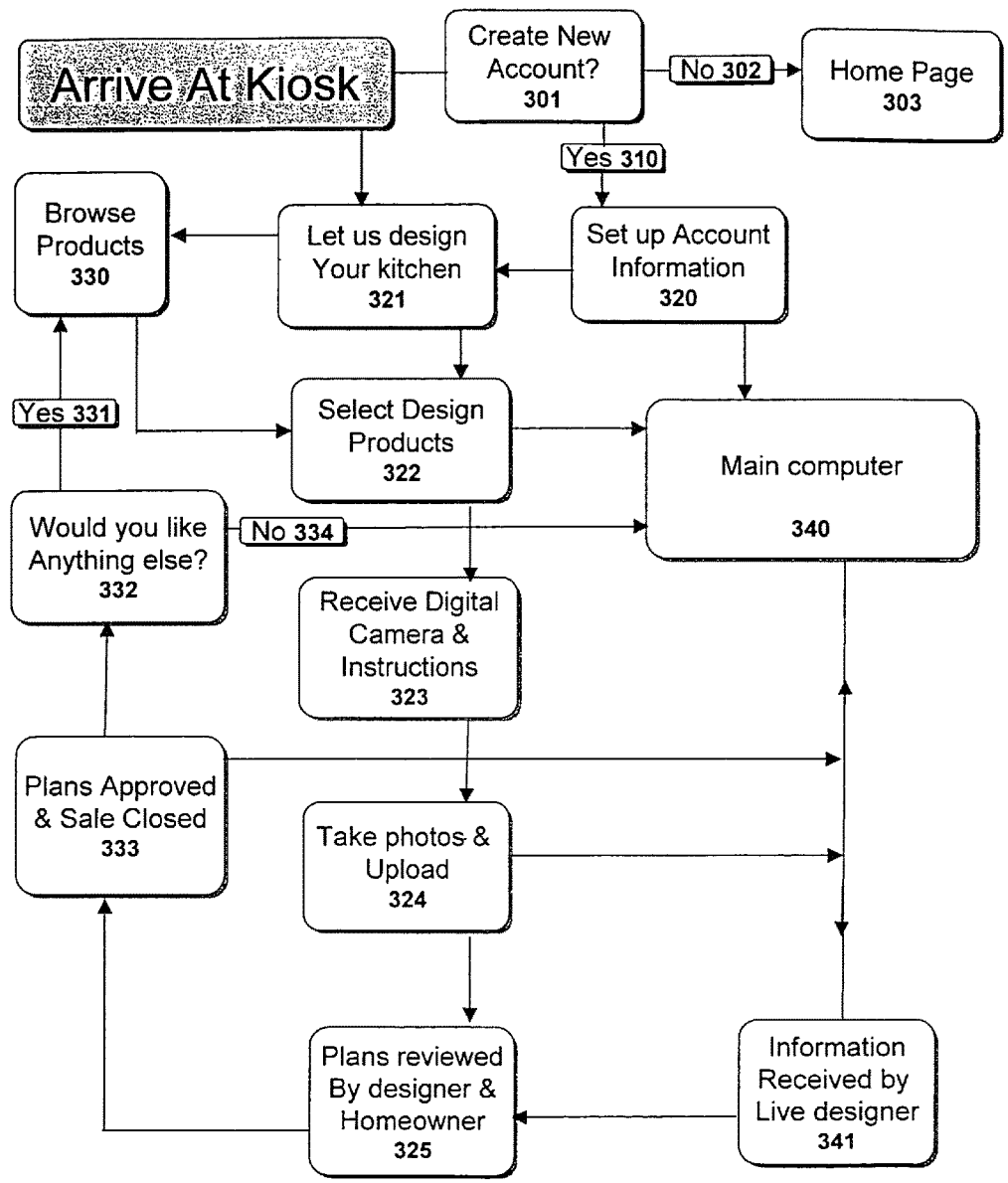
FIG. 3: Flow chart describing an exemplary interaction of a client at a kiosk for kitchen design located at a physical vendor location.
Figure 4:
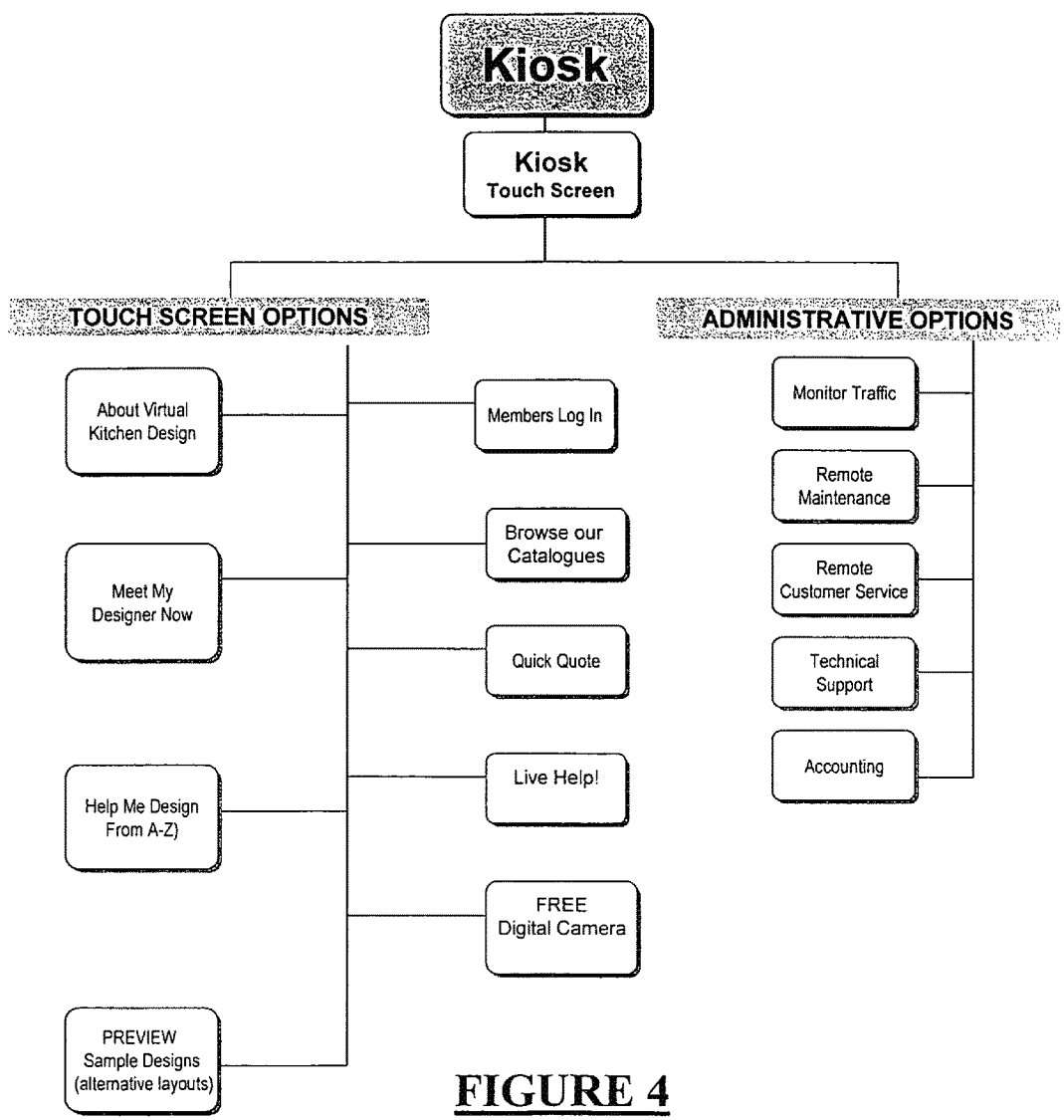
FIG. 4: Representation of a preferred embodiment of the invention describing touch screen options and administrative options at a kiosk.
Figure 5:
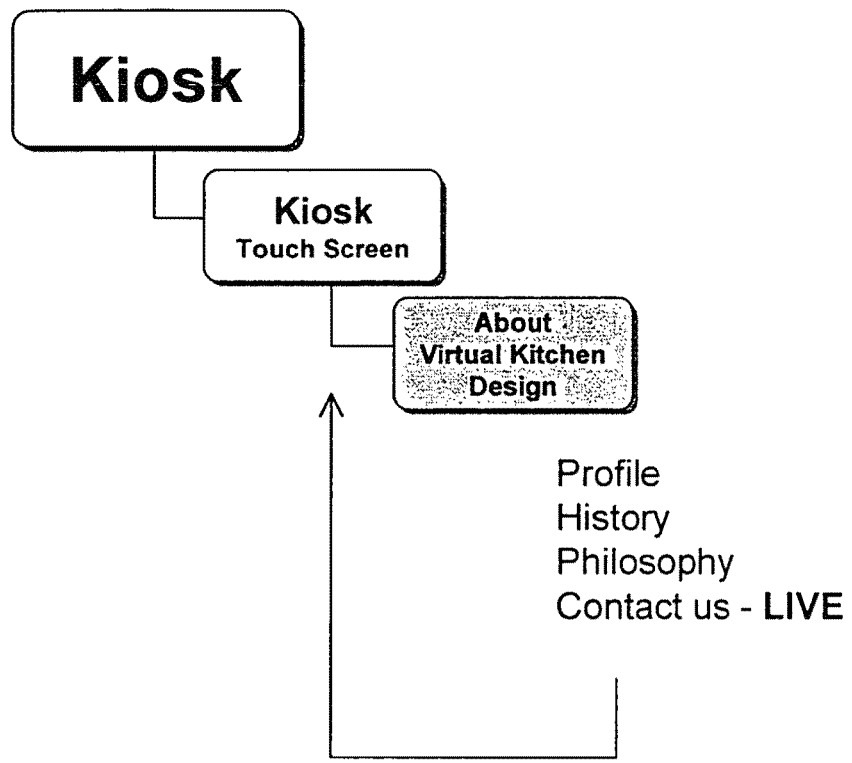
FIG. 5: Representation of a preferred embodiment of the invention describing direct design at a kiosk.
Figure 6:
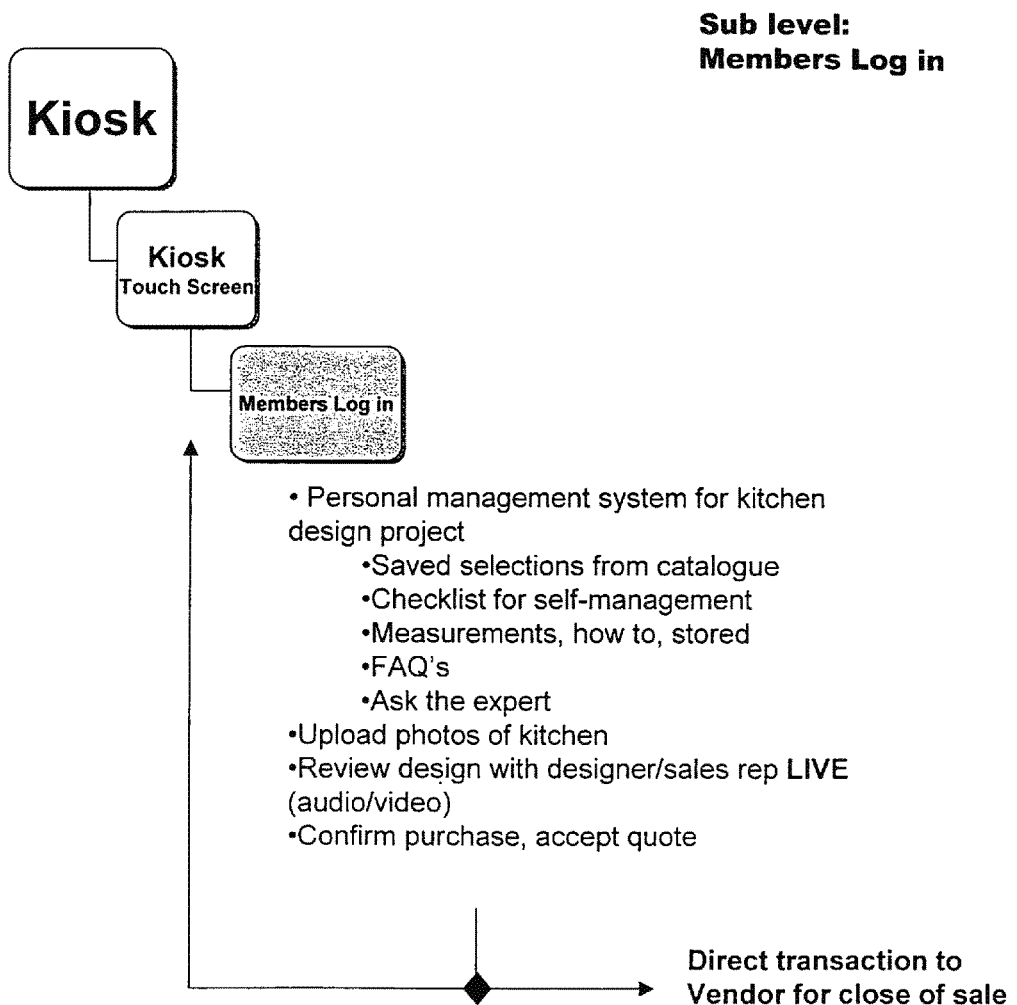
FIG. 6: Representation of a preferred embodiment of the invention describing member login at a kiosk.
Figure 7:
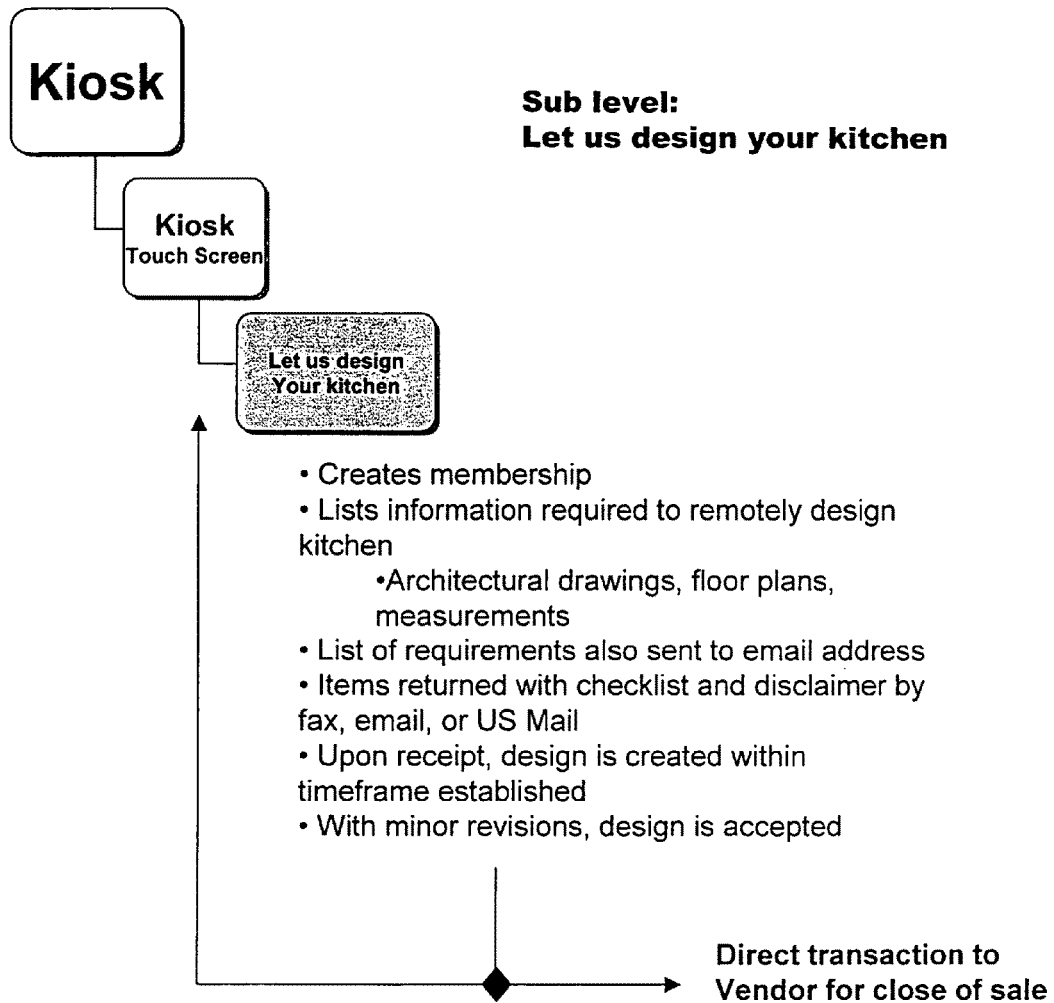
FIG. 7: Representation of a preferred embodiment of the invention describing kitchen design at a kiosk.
Figure 8:
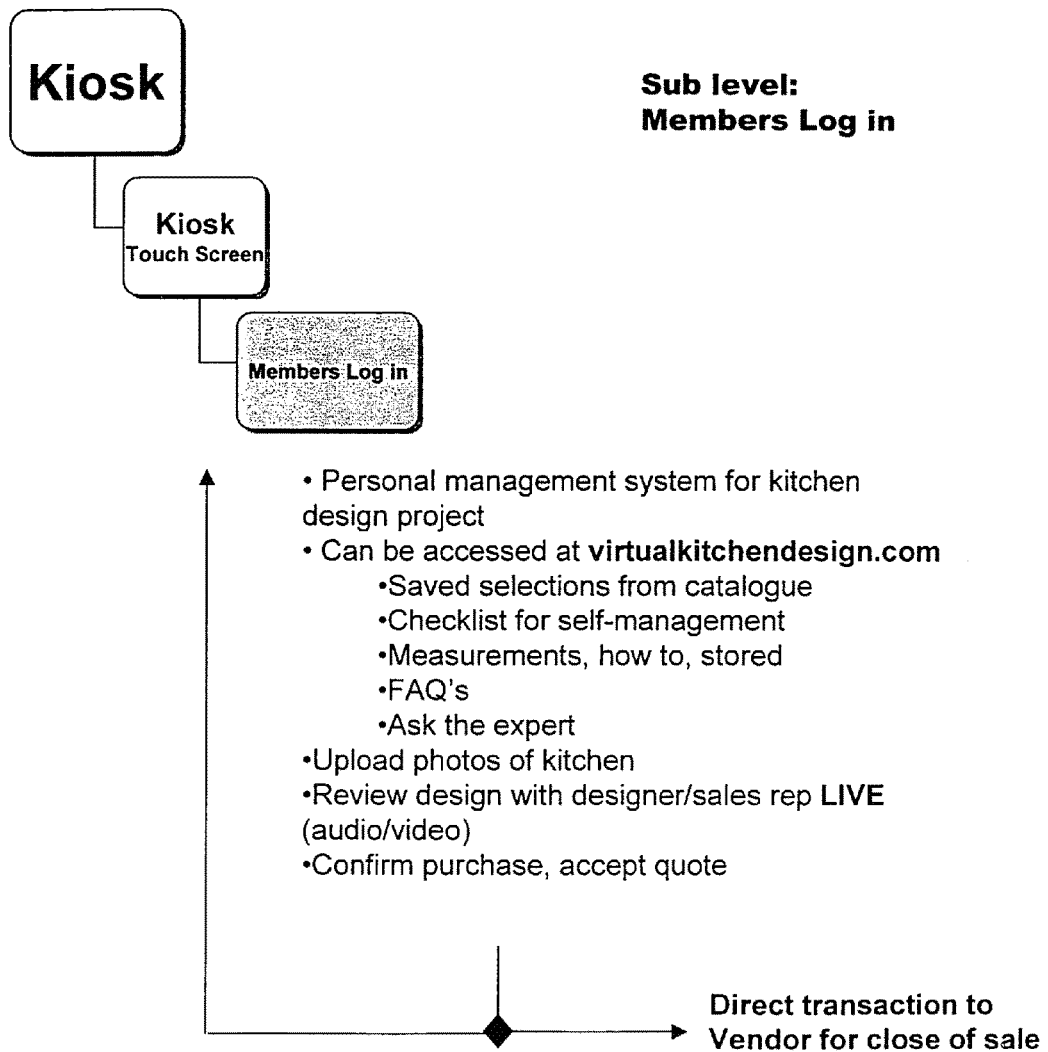
FIG. 8: Representation of a preferred embodiment of the invention describing personal management system for a kitchen design project accessible on the world wide web or at a kiosk.
Figure 9:
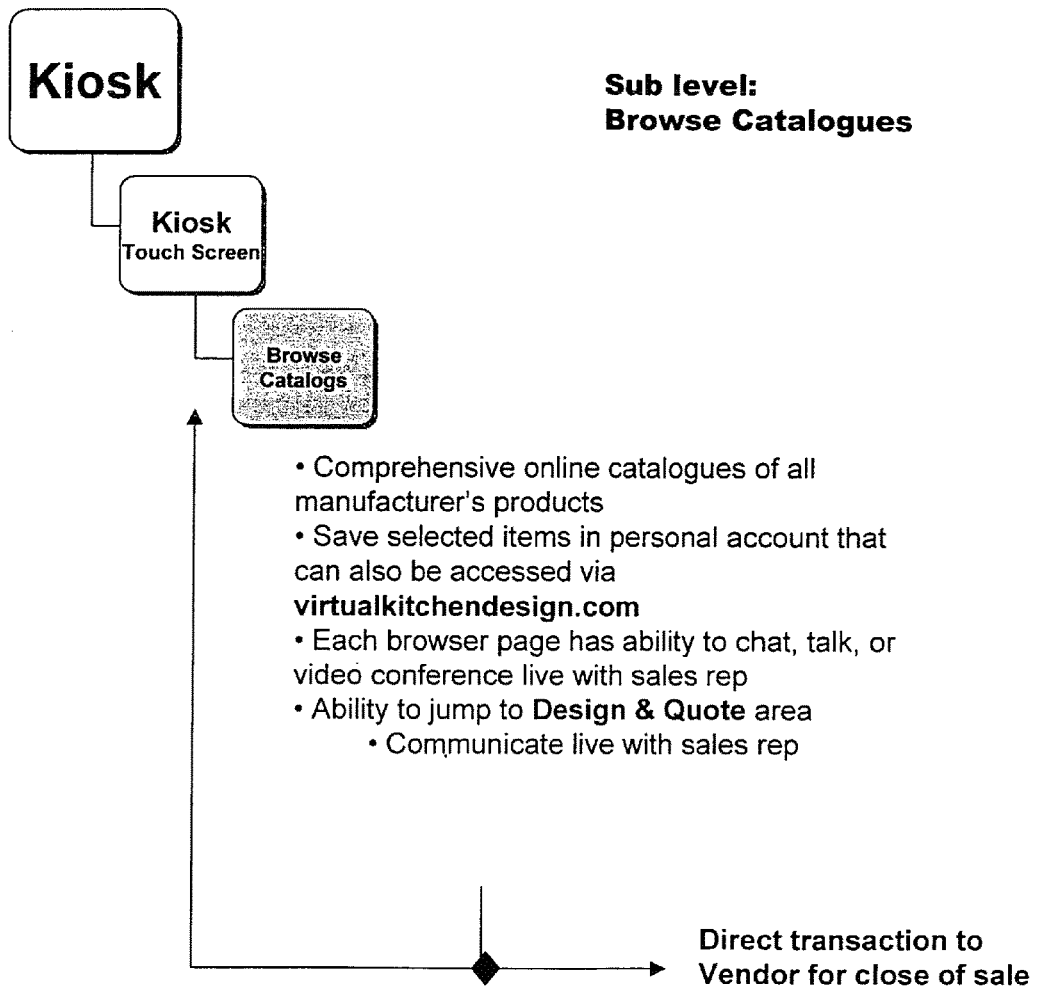
FIG. 9: Representation of a preferred embodiment of the invention describing design product selection and price quotation accessible on the world wide web or at a kiosk.
Figure 10:
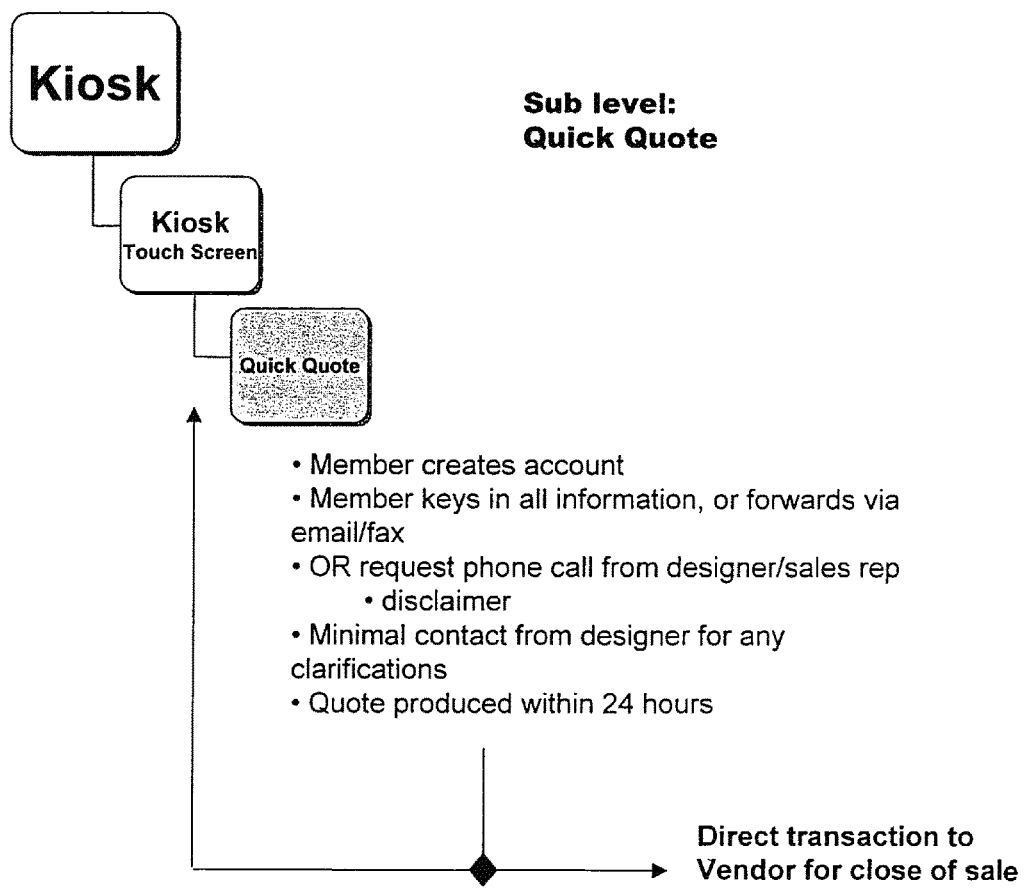
FIG. 10: Representation of a preferred embodiment of the invention describing quick quote option at a kiosk.
Figure 11:
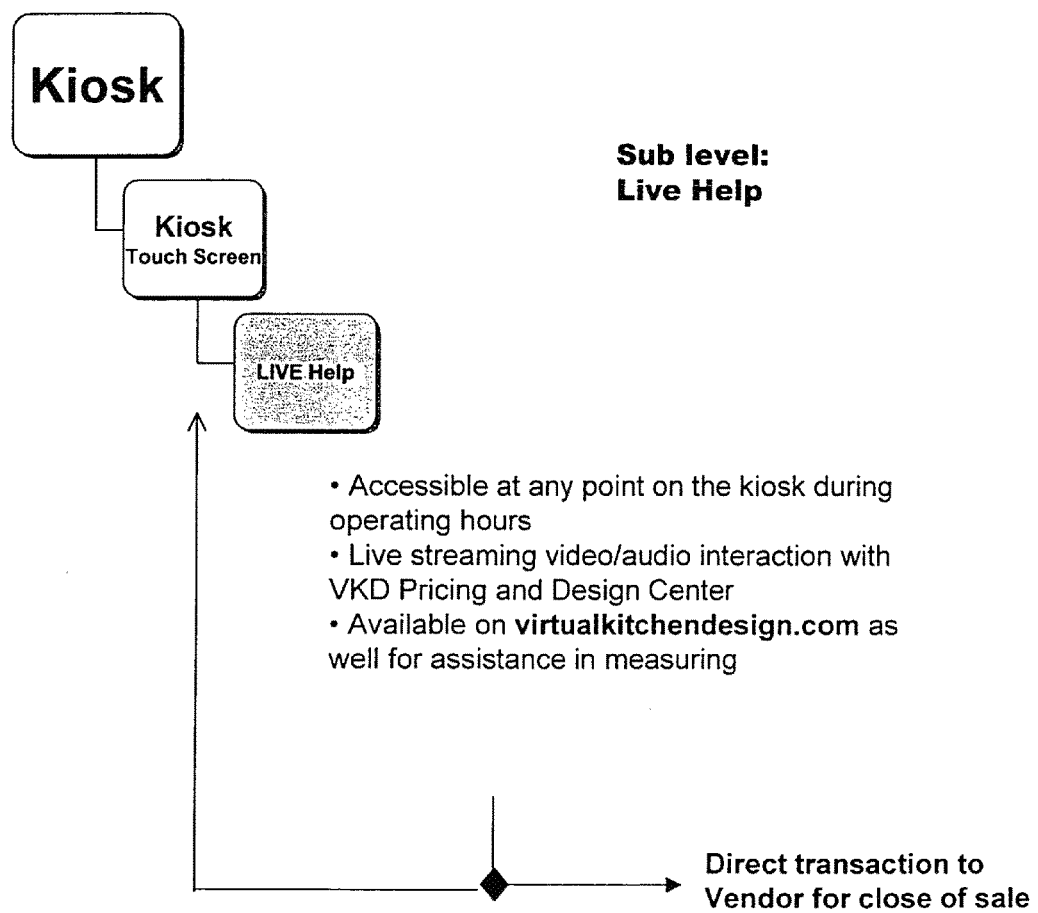
FIG. 11: Representation of a preferred embodiment of the invention describing live help option at a kiosk.
Figure 12:
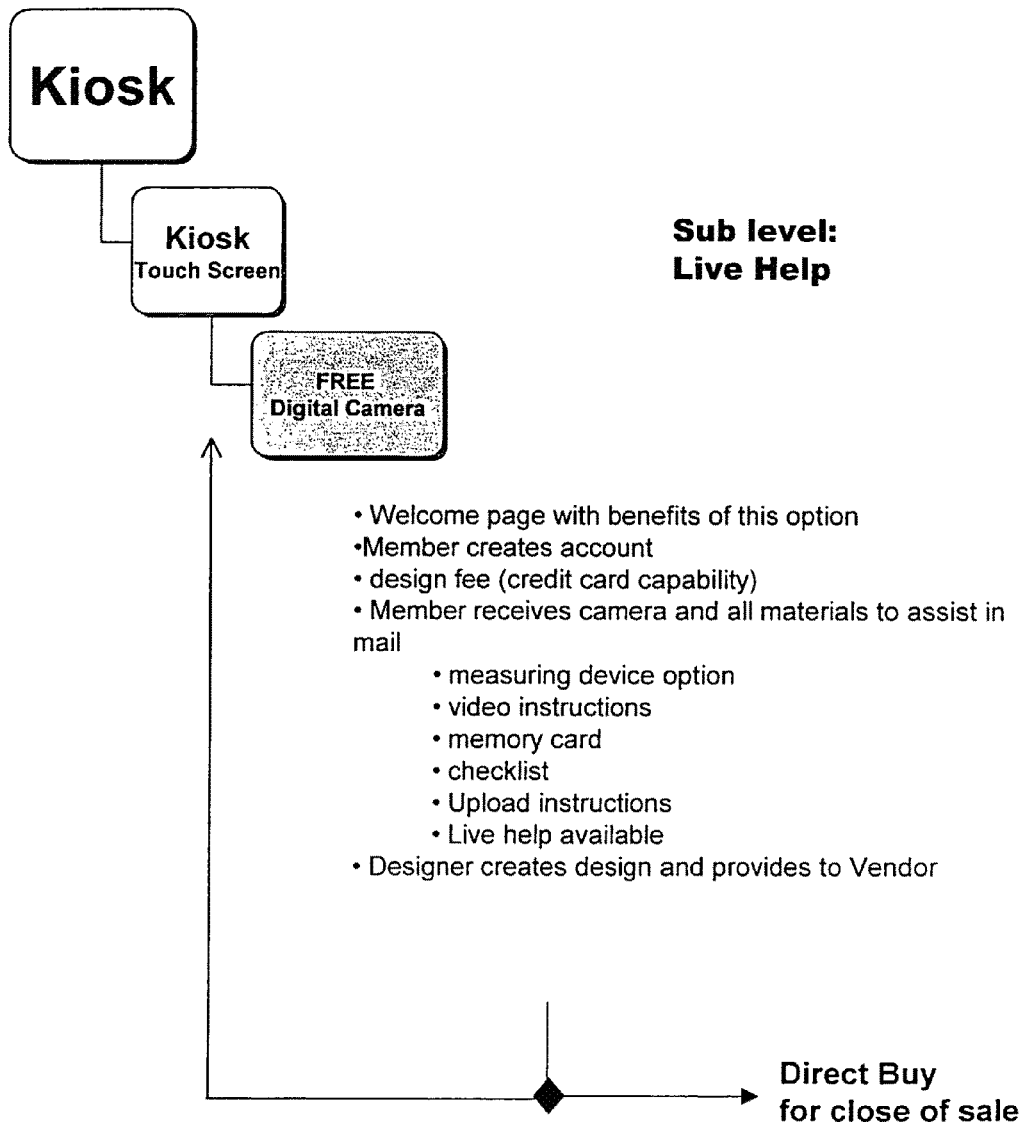
FIG. 12: Representation of a preferred embodiment of the invention describing live help option at a kiosk.

The dimensions of objects in the digital image can be determined directly by examining and converting corresponding pixel dimensions of the image by means of an appropriate scale factor. A pixel dimension is the distance between two pixels, measured as the number of pixels represented by the straight line between to pixels, and is therefore related to the real dimension of the image according to the following relationship: Real Dimension=(Pixel Dimension) (Scale Factor). The Scale Factor is defined by a set of intrinsic parameters, which may be unique to each image, and has units of length/pixel. Turning to FIG. 1 shows a flow chart indicating an exemplary interaction of a client at a kiosk 1 for kitchen design. It is understood that the screens and options may be designed in a variety of ways providing a variety of options. The kiosk 1 presents the client/user with a screen of options including information about directed design at 110, receiving a digital camera at 120, kitchen design 130, browsing catalogues for kitchen design products at 141 and for a quick price quote on selected items at 140. In addition the client/user has the option to login to an already existing account at 111. If the client/user is already a member, having previously established an account, he can access stored data 113 or check on other project information such as design products selected for the project, which are associated with the account 114 or store additional data or information such as digital images 115. The data may be reviewed with a sales representative 126 or with a designer 127. If product has been selected the client/user may confirm the purchase 128. If the client/user opts to receive a digital camera 120 they create an account, thereby gaining membership 320. Entry of design requirements is stored at 124 and may be sent to a remote computer via electronic mail 125. If the client elected to browse for design products at 141 they may also elect to display visual images of the products at the terminal 142 and select design products and confirm for ordering at 128. Purchase is complete and the transaction closed 145. If a client user has elected to receive a quotation for selected design product 140, the information is stored in the member account 143 and the quote is delivered 144 either to the kiosk or via mail, e-mail, telephone or other client/user selected means. FIG. 2 details the interaction of the client/user who elects to receive a digital camera 120 in the example described in FIG. 1. Account information is collected and stored 320 thereby creating membership. This information includes personal information 220 and credit card information 221 and may include a membership fee. Live help is available at 222 at which time the client/user may elect to receive account information via electronic mail or other delivery means such as telephonic or hard copy via mail 231. The selected digital camera is issued for the account and delivered to the client/user at the kiosk or by other conventional delivery means such as through the mail 232. The client/user captures digital images of the space requiring design and transmits the images to the designer 251 either using his home personal computer 233 or at a kiosk 234 or by conventional mail delivery of the camera or the memory card there from 235. The Designer confirms and clarifies the images received by contacting the client/user 233 and proceeds to create the design and transmit the design to the main computer in a format accessible through client's account but not accessible by other client accounts 224. The client/user and the Designer review together the prepared design and any selected design products 225. Turning now to FIG. 3, the client/user information is transmitted to the main computer 340 including account information 320, kitchen design information 321 and selected design products 322, digital images taken by the client/user 324 and information received by the Designer 341. In addition the approved design plan and any transactional information 333 are stored at the main computer 340. FIGS. 4-12 show a preferred embodiment describing touch screen options at a kiosk. An initial "Splash" screen also known as a Welcome Page is typically graphically appealing and simple and may involve a revolving movie, no sound, hitting the high points and advantages of directed design, in a preferred embodiment, directed kitchen design also known as virtual kitchen design or VKD. The splash screen invites a client/user to "Touch Screen to begin". Initial options are "ABOUT US" or in the preferred embodiment, "About Virtual Kitchen Design" which provides a company profile, in this preferred embodiment, about VKD. Additional options describe cabinet and countertop lines, short descriptions of each vendor company and lead to screens such as "browse our catalogues". "Live Help" provides answers to questions from a human, advising a client/user to pick up a phone, which may be attached to the kiosk or which may be a virtual telephonic connection mediated via an Internet connection. Other screens provide information including a library of frequently asked questions also known as FAQ. An option is provided to "MEET MY DESIGNER NOW" initiating an interface with a directed design designer which may be effected electronically and with video and/or telephonic connection. A "Quick Quote" screen facilitates price comparisons with other design product vendors. "Preview Design" or in this preferred embodiment, "Preview Kitchen Design" provides the client/user with a visual image of a paradigmatic design kitchen with average features for each level of cabinet line. Price ranges may be selected by the client/user.

Example

A use of the present invention is illustrated by the following example.

Example

Kitchen Design

Client arrives at vendor location and activates direct design kiosk, marked as "Kitchen Cabinetry Direct Design with video and audio assist to a live vendor sales representative. Using the kiosk touch screen, the client has options to choose from such as (a) "Get your digital camera now" thereby creating an client user account; (b) "Browse cabinetry catalogue"; (c) "Talk to a Representative" with or without live video; (d) "Call Me Back"; (e) "Order Now".

Client selects the digital camera option, which is provided by the vendor to meet certain specifications facilitating photogrammetric extraction of dimensional data from two-dimensional images. Client creates a client user account including secure payment information such as credit card information and secure personal and contact information, thereby facilitating computer-mediated maintenance of client user specifications. The information is entered at the kiosk using the integrated video touch screen, which is well known in the art. The kiosk transmits the client information to a main computer, which stores on a computer media client information.

Client receives the digital camera either by mail or directly through the kiosk or by distribution of a vendor coupon voucher. Client also receives specific instructions for obtaining images of the location client requires for design. Client places a ruler in the visual field of the image to establish a measuring standard or reference point. However, photogrammetric analysis obviates the requirement of a dimensional standard. The instructions indicate that digital images may be transmitted to the main computer either through a direct phone link, by physically sending the memory media storing the images, or via Internet transmission. Client opts to transmit the images via the Internet using his personal home computer.

Client is then contacted directly by the designer confirming receipt of the digital images and initiating the designer-client personal relationship. The designer then creates a plan conforming to client's general specifications and requirements and transmits the design in digital form to the main computer in a form that is securely accessible from client's specific account but not accessible from other client accounts. Client is informed that the design and account information is also available at the kiosk location upon entry of required account security information. Client reviews the design plan on his home computer and contacts the designer by telephone with several modifications. Client and designer simultaneously view the design plan and make revisions in real-time as the designer operates the design software in response to client's directions. Client reviews the design plan and makes cabinet style selections and orders the selections from a provided vendor on-line catalogue, using a secure account algorithm. Client visits a vendor location and views countertop styles in person and then logs onto his account using a kiosk located at the vendor location. Client makes places his order.

Client takes the before and after "after" pictures using the provided digital camera, transmits the digital images to the main computer via his home personal computer internet connection and stores the images in his account for future reference.

Throughout this application, various publications and patents and patent applications are referenced. The disclosures of these publications in their entireties are hereby incorporated by reference into this application in order to more fully describe the state of the art.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A method for generating a design plan for a physical space comprising:
   providing a main computer having a database of design products;
   providing a remote computer that is capable of communicating with the main computer via the internet;
   placing an object within a physical space;
   directing a camera toward the physical space;
   using the camera to capture a first digital image of the physical space, wherein said object is visible within the first digital image;
   changing the angle at which the camera is directed toward the physical space and using the camera to capture a second digital image of the physical space, wherein said object is visible within the second digital image, wherein the object placed within the physical space is a ruler, and wherein the ruler is visible within the captured first and second digital images;
   transmitting the first and second digital images to the main computer;
   photogrammetrically assimilating the transmitted first and second digital images to produce a three-dimensional data set rendering of the physical space;
   using the three-dimensional data set rendering to create a design plan for the physical space;
   storing the design plan for the physical space on the main computer;
   using the remote computer for accessing the design plan for the physical space from the main computer.

2. The method of claim 1, further comprising providing a design center computer operable by a human design plan creator that is in communication with the main computer.

3. The method of claim 2, further comprising using the design center computer for creating the design plan.

4. The method of claim 2, further comprising:
   designing by non-automated means by the human design plan creator, the design plan using information extracted from the captured digital images, wherein the human design plan creator selects a design product from the database of design products; and
   adding the selected design product to the three-dimensional data set rendering of the physical space to create the design plan for the physical space.

5. The method of claim 4, further comprising transmitting the design plan for the physical space from the design center computer to the main computer.

6. The method of claim 5, further comprising providing for remote access to the design plan stored on the main computer.

7. The method of claim 1, further comprising providing an interactive kiosk operable by a design plan user that is in communication with the main computer.

8. The method of claim 7, further comprising exchanging data between the main computer and the interactive kiosk, wherein the design plan user can establish and access a design plan user account for maintaining and managing the design plan and the three-dimensional data set rendering of the physical space extracted from the captured digital images.

9. The method of claim 1, wherein the database of design products comprises individually identifiable design products having selectable product characteristics.

10. The method of claim 1, wherein each of the digital images has digitally encoded signals representing an image of the physical space.

11. The method of claim 1, further comprising the step of displaying the design plan on the remote computer.

12. The method of claim 1, wherein the remote computer is located at a vendor of the design products.

13. The method of claim 1, wherein the design plan is selected from the group consisting of a kitchen design plan, a landscaping design plan, a building design plan, an interior design plan, an exterior design plan, a clothing design plan and a product placement design plan.

14. The method of claim 13, further comprising storing a plurality of kitchen design products in the main computer, and displaying the kitchen design products on the remote computer in response to user search criteria.

15. The method of claim 1, further comprising:
establishing a known distance in the captured digital images using the ruler visible in the capture digital images, wherein the known distance having a first point and an end point;
dividing the known distance by the number of pixels represented on a straight line between the first point and the end point of the known distance;
measuring a pixel distance on the captured digital images, the pixel distance having a first pixel and a last pixel, wherein the pixel distance is the number of pixels represented on the straight line between the first pixel and the last pixel; and
multiplying the pixel distance by a scale factor.

16. The method of claim 1, further comprising the step of maintaining a plurality of computers that exchange information about the design products with the main computer.

17. A method of generating a design plan for a physical space comprising:
providing a main computer having a database of design products, wherein the main computer exchanges data with a remote computer, and exchanges data with a design center computer operable by a human design plan creator, wherein the database of design products comprises individually identifiable design products having selectable product characteristics;
providing a remote computer that is capable of communicating with the main computer via the internet;
placing a ruler within a physical space;
directing a camera toward the physical space;
using the camera to capture a first digital image of the physical space, wherein said ruler is visible within the first digital image;
changing the angle at which the camera is directed toward the physical space and using the camera to capture a second digital image of the physical space, wherein said object ruler is visible within the second digital image;
transmitting the first and second digital images to the main computer;
designing by non-automated means by the human design creator, a design plan using information extracted from the transmitted digital images, wherein the human design plan creator selects at least one design product from the database of design products, and adds the selected design product to the rendering on the main computer so as to produce at least one three-dimensional data set rendering on the main computer displaying the selected design product as part of the rendering.

18. The method of claim 17, further comprising:
storing the design plan in the design center computer;
transmitting the stored design plan from the design center computer to the main computer;
providing a remote link to the design plan stored on the design center computer;
exchanging data between the main computer and an electronically linked interactive kiosk, wherein the design plan user can establish and access a design plan user account for maintaining and managing the design plan.

19. The method of claim 17, wherein the design plan comprises a kitchen design plan.

20. A method for generating a design plan for a physical space comprising:
providing a main computer having a database of design products;
placing a ruler within a physical space;
directing a camera toward the physical space;
using the camera to capture a first digital image of the physical space, wherein said ruler is visible within the first digital image;
changing the angle at which the camera is directed toward the physical space and using the camera to capture a second digital image of the physical space, wherein said ruler is visible within the second digital image;
transferring the first and second digital images to the main computer;
photogrammetrically assimilating the first and second digital images to produce a three-dimensional data set rendering of the physical space;
using the three-dimensional data set rendering to create a design plan for the physical space;
storing the design plan for the physical space on the main computer.

21. The method of claim 20, further comprising:
providing a remote computer in communication with the main computer via the internet; and
using the remote computer for accessing the design plan for the physical space from the main computer, wherein the design plan is selected from the group consisting of a kitchen design plan, a landscaping design plan, a building design plan, an interior design plan, an exterior design plan, a clothing design plan and a product placement design plan.

* * * * *